United States Patent
Zhang et al.

(10) Patent No.: US 12,475,964 B2
(45) Date of Patent: Nov. 18, 2025

(54) BYPASS BUFFER FOR WORN OUT CODEWORDS

(71) Applicant: Sandisk Technologies, Inc., Milpitas, CA (US)

(72) Inventors: Lunkai Zhang, Portland, OR (US); Nathan Franklin, Belmont, CA (US); Raj Ramanujan, Federal Way, WA (US); Martin Lueker-Boden, Fremont, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 238 days.

(21) Appl. No.: 18/359,251

(22) Filed: Jul. 26, 2023

(65) Prior Publication Data
US 2024/0386981 A1 Nov. 21, 2024

Related U.S. Application Data

(60) Provisional application No. 63/502,572, filed on May 16, 2023.

(51) Int. Cl.
*G11C 29/18* (2006.01)
(52) U.S. Cl.
CPC .................................. *G11C 29/18* (2013.01)
(58) Field of Classification Search
CPC ....... G11C 29/18; G11C 29/52; G06F 3/0656; G06F 3/0616; G06F 3/0679
See application file for complete search history.

(56) References Cited

U.S. PATENT DOCUMENTS

| | | | | |
|---|---|---|---|---|
| 2013/0024748 | A1* | 1/2013 | Sharon | G06F 11/1072 711/E12.001 |
| 2015/0227424 | A1* | 8/2015 | Feng | G06F 11/1048 714/766 |
| 2017/0257121 | A1* | 9/2017 | Kwok | H03M 13/451 |
| 2017/0345510 | A1* | 11/2017 | Achtenberg | G11C 16/3413 |
| 2019/0050285 | A1* | 2/2019 | Lin | G06F 11/1048 |
| 2020/0019459 | A1* | 1/2020 | Cadloni | G06F 11/142 |
| 2022/0179734 | A1* | 6/2022 | Fackenthal | G06F 12/0804 |
| 2023/0052799 | A1* | 2/2023 | Lee | G06F 3/0619 |
| 2023/0068529 | A1* | 3/2023 | Walker | G06F 3/0604 |
| 2024/0386981 | A1* | 11/2024 | Zhang | G11C 29/18 |

* cited by examiner

*Primary Examiner* — Albert Decady
*Assistant Examiner* — Osman M Alshack
(74) *Attorney, Agent, or Firm* — DENTONS Durham Jones Pinegar

(57) ABSTRACT

A bypass buffer stores codewords that have been identified as worn out codewords due to stuck-at-failure bit errors and/or other endurance failures. A controller of a data storage device monitors the number of worn out bits of a codeword stored by a memory device of the data storage device. If the number of worn out bits of the codeword exceeds a threshold number of worn out bits, data associated with the codeword is corrected and stored in the bypass buffer. The memory address associated with the codeword is also stored in the bypass buffer and associated with the corrected codeword.

20 Claims, 10 Drawing Sheets

800

| VALID ENTRY INDICATOR | CONFIDENCE INDICATOR | MEMORY ADDRESS | CODEWORD |
|---|---|---|---|
| VALID ENTRY INDICATOR | CONFIDENCE INDICATOR | MEMORY ADDRESS | CODEWORD |
| VALID ENTRY INDICATOR | CONFIDENCE INDICATOR | MEMORY ADDRESS | CODEWORD |
| VALID ENTRY INDICATOR | CONFIDENCE INDICATOR | MEMORY ADDRESS | CODEWORD |
| VALID ENTRY INDICATOR | CONFIDENCE INDICATOR | MEMORY ADDRESS | CODEWORD |

FIG. 8

BYPASS BUFFER FOR WORN OUT CODEWORDS

CROSS-REFERENCE TO RELATED APPLICATIONS

The present application claims priority to U.S. Provisional Application 63/502,572 entitled "BYPASS BUFFER FOR WORN OUT CODEWORDS", filed on May 16, 2023, the entire disclosure of which is hereby incorporated by reference in its entirety.

BACKGROUND

Stuck-at-failure is a type of endurance failure in memory devices including Magnetic Random Access Memory (MRAM) devices and Phase-Change Memory (PCM) devices. Typically, stuck-at-failure is a type of bit error that occurs when a particular memory cell of the memory device is stuck at a particular logic level (e.g., a logic "1" or a logic "0") regardless of the input signal and/or the output signal associated with the particular memory cell.

As a memory device ages, stuck-at-failures may become one of the dominant failure types for the memory device. Existing solutions include using strong error correction codes (ECCs) to correct the stuck-at-failure bits for a particular codeword. However, ECCs typically correct up to a certain number of bits within the codeword. Further, the bit correction capability of the ECCs is for all of the failures (e.g., soft bit errors such as retention errors and/or read disturb errors) associated with the codeword, not just stuck-at-failures. Thus, as more stuck-at-failures occur, the ability for the ECCs to correct other types of errors is dramatically reduced.

Accordingly, it would be beneficial to identify and bypass codewords that are stored in a memory device that have a high number of stuck-at-failure bits.

SUMMARY

The present application describes a bypass buffer that stores codewords that have been identified as worn out (or that have a high number of worn out bits) due to stuck-at-failure bit errors and/or other endurance failures. As will be explained in greater detail herein, a controller of associated with a memory device may monitor the number of worn out bits (e.g., bits of a codeword that are stuck at a particular logic level) of a codeword stored by the memory device. If the number of worn out bits of the codeword exceeds a threshold number of worn out bits, data associated with the codeword is corrected and stored in a bypass buffer. The memory address associated with the codeword is also stored in the bypass buffer.

When a command (e.g., a read command or a write command) is received, the bypass buffer is checked to determine whether a memory address associated with the command is included as an entry in the bypass buffer. If the memory address associated with the command is included as an entry in the bypass buffer, the command is executed on the codeword/entry in the bypass buffer. However, if the memory address associated with the command is not found as an entry in the bypass buffer, the command may be executed on data associated with the memory address of the memory device.

Accordingly, the present application describes a method for identifying worn out codewords. In an example, the method includes reading data associated with a codeword located at a memory address of a memory device. The data associated with the codeword is stored in a temporary storage location. Test data is written to the memory address associated with the codeword. In an example, the test data includes a number of bits with each bit having a first state. The test data is then read from the memory address associated with the codeword. A determination is made regarding a number of bits in the test data that have a second state that is different from the first state. Based, at least in part, on determining the number of bits in the second state is above a threshold, the data associated with the codeword is stored as an entry in a bypass buffer. Additionally, the entry in the bypass buffer is associated with the memory address of the memory device.

The present application also describes a data storage device that includes a controller and a memory. The memory is communicatively coupled to the controller and stores instructions that are to be executed by the controller. When the controller executes the instructions, the controller performs various operations. In an example, the operations include reading data associated with a codeword located at a memory address of a memory device of the data storage device and storing the data associated with the codeword in a temporary storage location. Test data is written to the memory address of the memory device to determine a number of worn out bits associated with the codeword. In an example, the test data includes a number of bits with each bit being in the same state. The test data may then be read from the memory address. A determination is made regarding the number of bits in the test data having a different state. Based, at least in part, on determining the number of bits in the different state is above a threshold, the data associated with the codeword is stored as an entry in a bypass buffer and the entry in the bypass buffer is associated with the memory address of the memory device.

A data storage device is also described. The data storage device includes means for reading data associated with a codeword located at a memory address of a memory device of the data storage device and means for storing the data associated with the codeword in a temporary storage location. The data storage device may also include means for writing test data to the memory address. The data storage device may also include means for determining a number of worn out bits associated with the codeword. In an example, the number of worn out bits is based, at least in part, on a number of bits having a first state associated with the test data and a number of bits having a second state that is different from the first state. The data storage device also includes means for storing the data associated with the codeword as an entry in a bypass buffer. In an example, the data associated with the codeword is stored as an entry in the bypass buffer when it is determined that the number of bits in the second state is above a threshold. The data storage device also includes means for associating the entry in the bypass buffer with the memory address of the memory device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 8 illustrates a bypass buffer having a confidence indicator according to an example.

DETAILED DESCRIPTION

Figure 1:
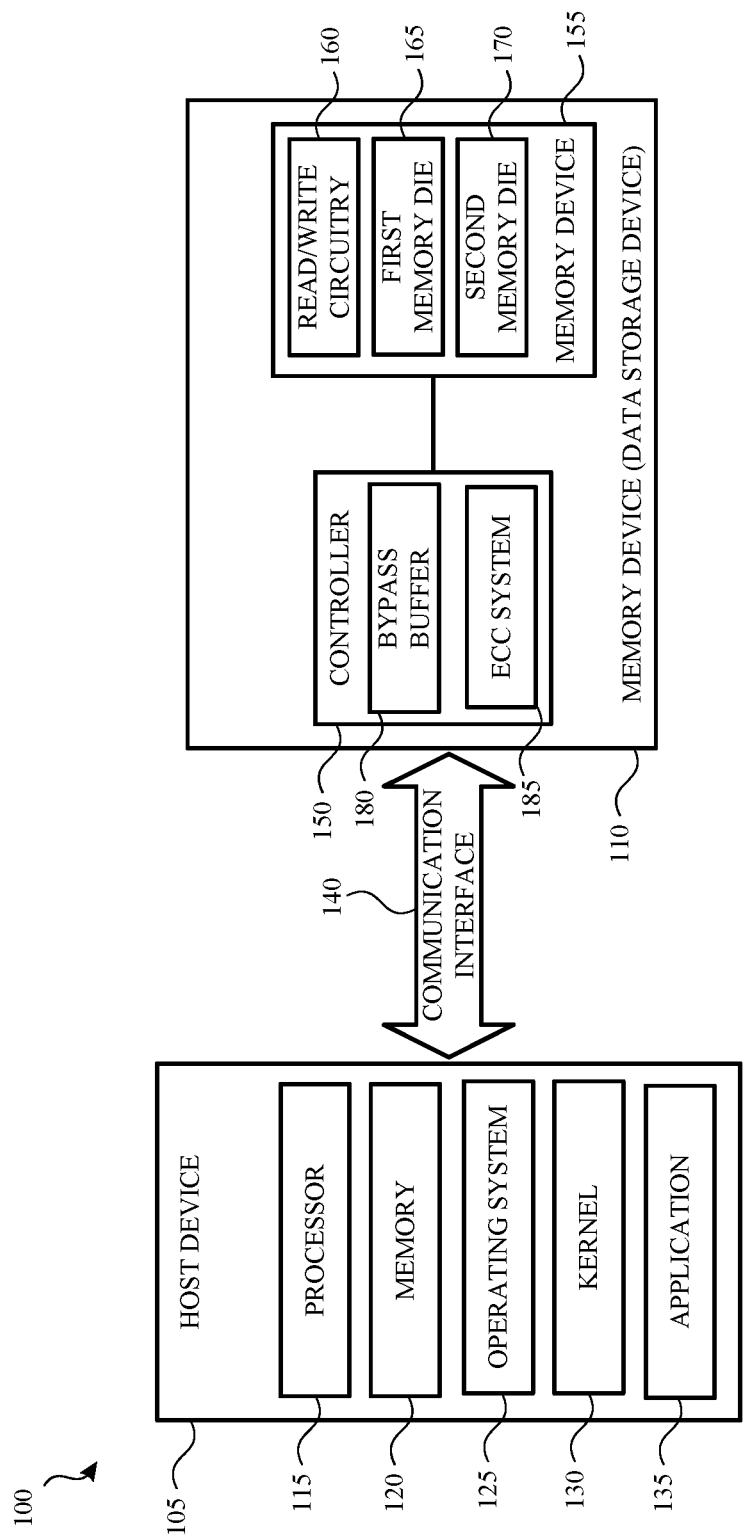
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

As previously explained, stuck-at-failure is a type of endurance failure in many types of memory devices including MRAM devices and PCM devices. Typically, stuck-at-failure is a type of bit error that occurs when a particular cell (or cells) of the memory device is stuck at either a logic "1" or a logic "0", regardless of the signals associated with the particular memory cell.

As a data storage device ages, stuck-at-failures may become one of the dominant failure types. In order to address stuck-at-failures, strong error correction codes (ECCs) are used. However, ECCs typically correct up to a certain number of bits within a particular codeword. For example, a particular ECC may correct up to eleven bits of the particular codeword. However, the eleven bits that are corrected may include stuck-at-failure errors and soft bit errors. Thus, if the particular codeword has six stuck-at-failure errors, the ECC can only correct five soft errors. As more stuck-at-failures occur, the ability to correct other types of errors is dramatically reduced.

In order to address the above, the present application describes a bypass buffer that stores codewords that have been identified as worn out due to stuck-at-failure bit errors and/or other endurance failures. As will be explained in greater detail herein, a controller of a data storage device monitors the number worn out bits (e.g., bits of a codeword that are stuck at a particular logic level) of a codeword stored by a memory device of the data storage device. If the number of worn out bits of the codeword exceeds a threshold number of worn out bits, data associated with the codeword is corrected and stored in a bypass buffer. The memory address associated with the codeword is also stored in the bypass buffer and is associated with the codeword.

When a command (e.g., a read command or a write command) is received, the bypass buffer is checked to determine whether a memory address associated with the command is included as an entry in the bypass buffer. If the address associated with the command is included as an entry in the bypass buffer, the command is executed on the codeword/entry in the bypass buffer. However, if the address associated with the command is not found as an entry in the bypass buffer, the command may be executed on data associated with the memory address of the memory device.

Accordingly, many technical benefits may be realized including, but not limited to, improving the reliability of aged data storage devices by helping ensure ECC capabilities are reserved for soft errors, increasing a lifetime the data storage device, and relaxing ECC capability requirements of aged data storage devices thereby enabling resources to be utilized by other operations/tasks.

These benefits, along with other examples, will be shown and described in greater detail with respect to FIG. 1-FIG. 11.

FIG. 1 is a block diagram of a system 100 that includes a host device 105 and a memory device/data storage device 110 according to an example. In an example, the data storage device 110 may be equivalent to a memory device. For example, the memory device/data storage device 110 may be a MRAM device, a PCM device, a Solid State Drive (SSD) or any other NAND-based memory device. In an example, the host device 105 includes a processor 115 and a memory 120 (e.g., main memory). The memory 120 may include or otherwise be associated with an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 115 may include a System on a Chip (SoC).

In an example, the memory 120 can be used by the host device 105 to store data used, or otherwise executed by, the processor 115. Data stored in the memory 120 may include instructions provided by the memory device/data storage device 110 via a communication interface 140. The data stored in the memory 120 may also include data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 may create a virtual address space for the application 135 and/or other processes executed by the processor 115. The virtual address space may map to locations in the memory 120. The operating system 125 may also include or otherwise be associated with a kernel 130. The kernel 130 may include instructions for managing various resources of the host device 105 (e.g., memory allocation), handling read and write requests and so on.

The communication interface 140 communicatively couples the host device 105 and the memory device/data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the memory device/data storage device 110 need not be physically co-located and may communicate over a network such as a Local Area Network (LAN) or a Wide Area Network (WAN), such as the internet. In addition, the host device 105 may interface with the memory device/data storage device 110 using a logical interface specification such as Non-Volatile Memory express (NVMe) or Advanced Host Controller Interface (AHCI).

The memory device/data storage device 110 may include a controller 150 and a memory device 155. In an example, the controller 150 is communicatively coupled to the memory device 155. The memory device 155 may be MRAM device, a PCM device, a Solid State Drive (SSD) or any other NAND-based memory device. Although specific examples are given, the memory device 155 may be any type of storage device to which data is written and from which data is read.

In an example, the memory device 155 includes one or more memory dies (e.g., first memory die 165 and second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

In some examples, the memory device/data storage device 110 may be attached to or embedded within the host device 105. In another example, the memory device/data storage device 110 may be implemented as an external device or a portable device that can be communicatively or selectively coupled to the host device 105. In yet another example, the memory device/data storage device 110 may be a component (e.g., a solid-state drive (SSD)) of a network accessible data storage system, a network-attached storage system, a cloud data storage system, and the like.

The memory device 155 may also include support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

In an example, one or more of the first memory die 165 and the second memory die 170 include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

As previously described, the memory device/data storage device 110 may also include a controller 150. The controller 150 may be communicatively coupled to the memory device 155 via a bus, an interface or other communication circuitry. In an example, the communication circuitry may include one or more channels to enable the controller 150 to communicate with the first memory die 165 and/or the second memory die 170 of the memory device 155. In another example, the communication circuitry may include multiple distinct channels which enables the controller 150 to communicate with the first memory die 165 independently and/or in parallel with the second memory die 170 of the memory device 155.

The controller 150 may receive data and/or instructions from the host device 105. The controller 150 may also send data to the host device 105. For example, the controller 150 may send data to and/or receive data from the host device 105 via the communication interface 140. The controller 150 may also send data and/or commands to and/or receive data from the memory device 155.

The controller 150 may send data and a corresponding write command to the memory device 155 to cause the memory device 155 to store data at a specified address of the memory device 155. In an example, the write command specifies a physical address of a portion of the memory device 155. The controller 150 may also send data and/or commands associated with one or more background scanning operations, garbage collection operations, and/or wear leveling operations.

The controller 150 may also send one or more read commands to the memory device 155. In an example, the read command specifies the physical address of a portion of the memory device 155 at which the data is stored. The controller 150 may also track the number of program/erase cycles or other programming operations that have been performed on or by the memory device and/or the memory dies of the memory device 155.

The controller 150 may also include or otherwise be associated with a bypass buffer 180. In an example, the bypass buffer 180 stores codewords that have been identified as worn out due to stuck-at-failure bit errors and/or other endurance failures. For example, the controller 150 periodically checks a number of worn out bits (e.g., bits of a codeword that are stuck at either a logic "1" or a logic "0" due to stuck-at-failures) in each codeword stored by the memory device 155. If the number of worn out bits exceeds a threshold, the codeword is corrected (e.g., using ECC operations) and stored as an entry in the bypass buffer 180. A memory address of the memory device 155 that is associated with the worn out codeword is also stored in the bypass buffer 180 and is associated with the corrected codeword.

As subsequent read and/or write commands are received by the controller 150, the controller 150 checks the bypass buffer 180 to determine whether the memory address associated with the received command is stored as an entry in the bypass buffer 180. If the memory address associated with the command is stored as an entry in the bypass buffer 180, the command is executed on the codeword stored in the bypass buffer 180. However, if the memory address associated with the command is not stored as an entry in the bypass buffer 180, the command is executed on the codeword stored in the memory address of the memory device 155.

The controller 150 may also include or otherwise be associated with an error correction code (ECC) system 185. In an example, the ECC system 185 may work with the bypass buffer 180. For example, the ECC system 185 may receive a codeword that has been identified as having over a threshold number of worn out bits. The ECC system 185 may correct the errors and/or generate one or more ECC codewords based, at least in part, on the corrected data. For example, the ECC system 185 may include an encoder that encodes the received data using one or more encoding techniques. The ECC system 185 may also include a decoder to decode data read from the memory device 155. The ECC system 185 may also detect and correct bit errors that may be present in the stored/read data. For example, the ECC system 185 may correct a number of bit errors up to an error correction capability of a particular ECC technique used by the ECC system 185.

Figure 2:
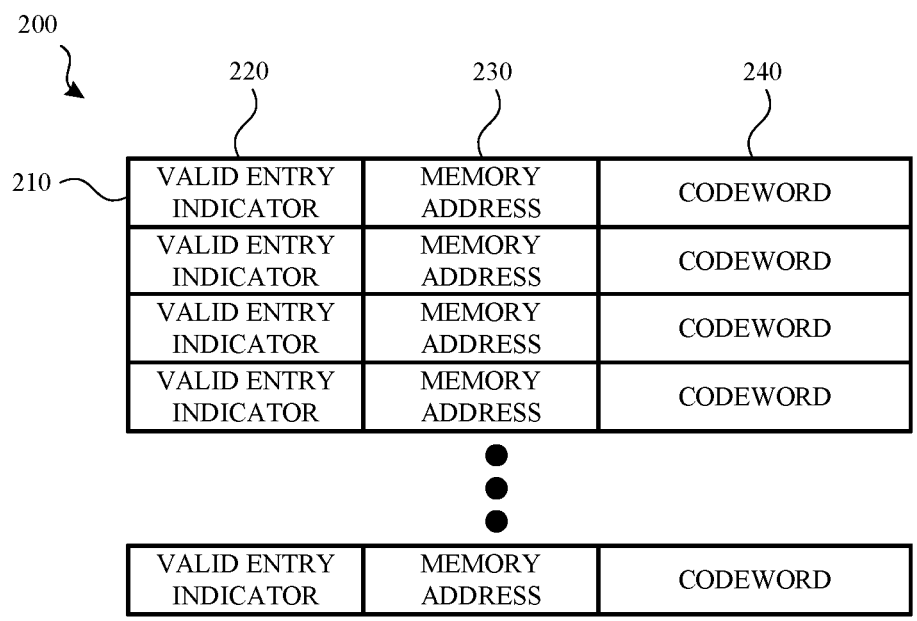
FIG. 2 illustrates a bypass buffer for storing worn out codewords according to an example.

FIG. 2 illustrates a bypass buffer 200 for storing worn out codewords according to an example. In an example, the bypass buffer 200 may be similar to the bypass buffer 180 shown and described with respect to FIG. 1. The bypass buffer 200 may be a structured as a content-addressable memory (CAM) or some other associative memory that allows data to be retrieved based on its content, rather than based on a specific memory address.

In an example, the bypass buffer 200 includes n number of entries 210. For example, the bypass buffer 200 may include one-thousand entries. Although one-thousand entries are mentioned, the bypass buffer 200 may include any number of entries 210. Each entry 210 of the bypass buffer 200 may include a valid entry indicator 220, a memory address 230 and a codeword 240.

In an example, the codeword 240 of each entry 210 is a codeword that was identified as having over a threshold number of worn out bits. For example, if a controller determines a particular codeword stored at a particular memory address of a memory device (e.g., memory device 155 (FIG. 1)) has x worn out bits and also determines that x exceeds a worn out bit threshold, the controller causes an error correction system (e.g., ECC system 185 (FIG. 1)) to correct any errors in the codeword caused by the worn out bits, as well as any soft bit errors in the codeword. The controller may then cause the corrected codeword to be stored as an entry 210 in the bypass buffer 200.

The controller may also cause the memory address 230 of the memory device from which the original codeword was read to be stored in the bypass buffer 200. In an example, the memory address 230 is associated with the corrected codeword 240 in the bypass buffer 200.

The bypass buffer 200 also includes a valid entry indicator 220. In an example, the valid entry indicator 220 is a bit or other indicator that informs the controller that a particular entry 210 in the bypass buffer 200 includes valid data (e.g., a corrected codeword 240 and a memory address 230 associated with the originally read codeword) rather than data that was used to initialize the bypass buffer 200.

Additional information about the bypass buffer 200, as well as how the bypass buffer 200 is populated and used, is explained in more detail with respect to FIG. 3-FIG. 7.

Figure 3:
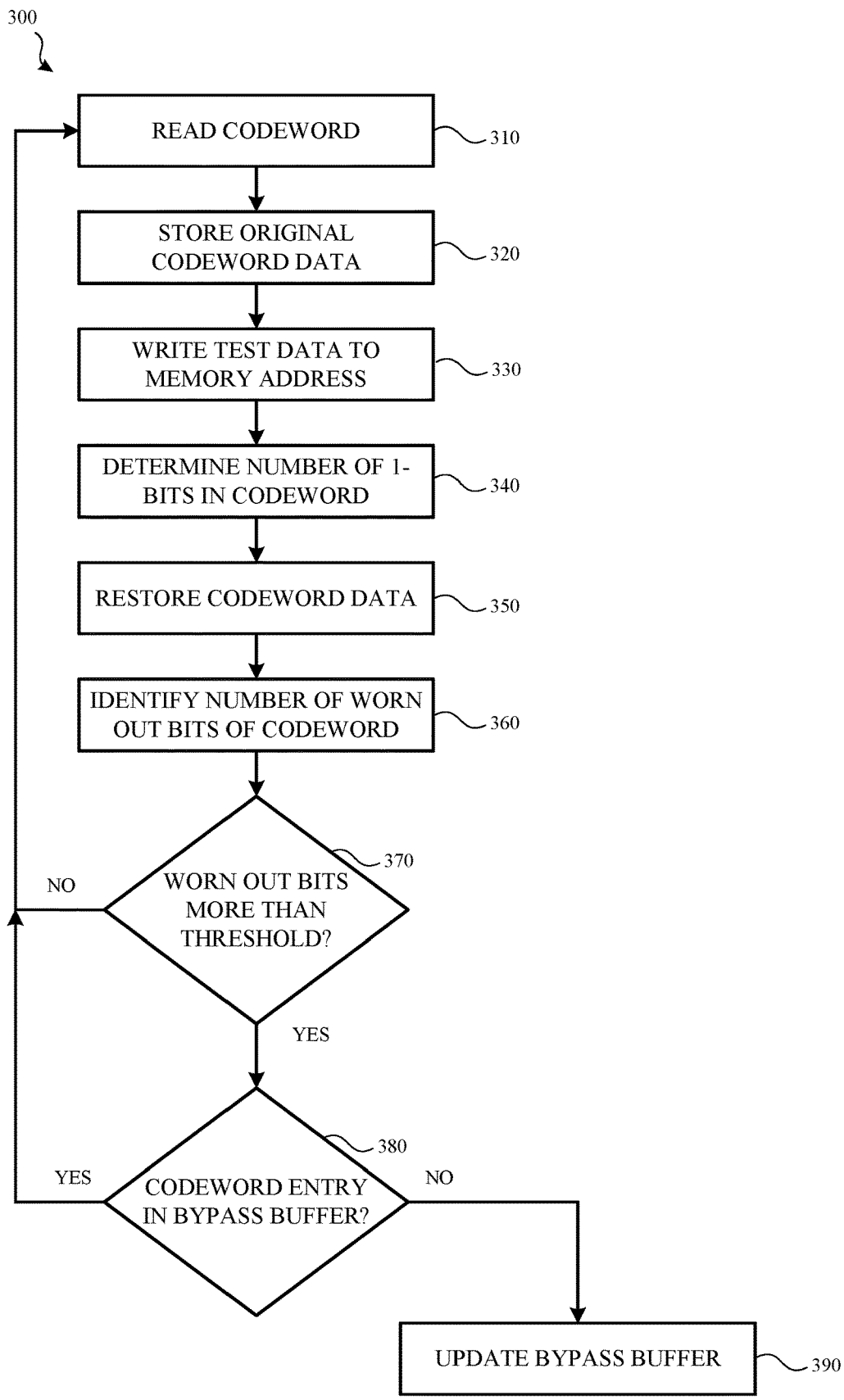
FIG. 3 illustrates a method for determining whether a codeword should be added to a bypass buffer according to an example.

FIG. 3 illustrates a method 300 for determining whether a codeword should be added to a bypass buffer according to an example. In an example, the method 300 may be performed or otherwise executed by a controller such as, for example, controller 150 shown and described with respect to FIG. 1. Likewise, the bypass buffer described with respect to FIG. 3 may be the bypass buffer 180 shown and described with respect to FIG. 1 and/or the bypass buffer 200 shown and described with respect to FIG. 2.

Method 300 begins when a codeword is read (310) from a memory address of a memory device (e.g., memory device 155 (FIG. 1)). In an example, the controller may periodically read some, or all, of the codewords stored by the memory device to determine whether one or more codewords should be added to the bypass buffer.

In another example, the controller may read one or more codewords from the memory device based on one or more trigger conditions. In an example, the trigger conditions may include, but are not limited to, an age of the memory device, a number of program/erase cycles performed by the memory device, an amount of time/resources spent executing ECC operations and so on. In another example, codewords associated with a particular address range in the memory device may be selected (e.g., manually or automatically) and undergo the method 300 described herein.

Once the codeword is read from the memory address of the memory device, the original codeword data is stored (320) in a temporary memory location. In an example, the temporary memory location may be in the bypass buffer. In another example, the temporary memory location may be a reserved memory location in the memory device. As part of this process, the codeword may undergo an error correction code process to help ensure data associated with the codeword is accurate/correct.

When the codeword has been stored in the temporary memory location, the controller writes (330) test data to the memory address of the memory device from which the codeword was read. In an example, the test data includes a number of bits and each bit has the same logical value. For example, the test data may include all 1-bits or all 0-bits. In an example, the logical value of each bit of the test data may depend on how stuck-at-failures are manifest.

For example, if the stuck-at-failures of the codeword are manifest as 1-bits, the test data includes all 0-bits. Likewise, if the stuck-at-failures are manifest as 0-bits, the test data includes all 1-bits. In the example of FIG. 3, the stuck-at-failures manifest as 1-bits. As such, the test data includes all 0-bits. However, as previously explained, the test data may have bits in a first state while stuck-at-failure bits may be represented by bits having a second, different state.

Once the test data has been written to the memory address of the memory device, the controller determines (340) the number of 1-bits in the codeword. Because the test data included all 0-bits, the number of 1-bits that are read from the memory address indicate the number of worn out bits of the codeword.

The controller may then restore (350) the original data associated with the codeword (or the corrected data) to the memory address of the memory device from which the codeword was read (e.g., in operation 310). In an example, restoring the original data associated with the codeword includes reading the codeword from the temporary memory location and writing the codeword to the memory address of the memory device.

The controller may also identify (360) or otherwise determine the number of worn out bits of the codeword. As previously indicated, the number of worn out bits of the codeword is based, at least in part, on the number of bits that have a logical state opposite, or different from, the logical state of the bits of the codeword that includes the test data.

The controller may then determine (370) whether the number of worn out bits of the codeword exceeds a worn out bit threshold. If it is determined that the number of worn out bits of the codeword does not exceed the worn out bit threshold, the method 300 may be repeated for another codeword.

However, if it is determined (370) that the number of worn out bits of the codeword exceeds the worn out bit threshold, the controller may also determine (380) whether the bypass buffer already includes an entry for the codeword. As part of this process, the controller may determine whether the bypass buffer includes an entry that includes the codeword and the memory location of the memory device that originally stored the codeword. To make this determination, the controller may compare the memory address associated with the memory location from which the codeword was read to each memory address field (e.g., memory address 230 (FIG. 2)) of each entry of the bypass buffer.

If the controller determines (380) the bypass buffer already includes an entry for this particular codeword/memory address, the method 300 may be repeated for another codeword. However, if the controller determines (380) the bypass buffer does not include an entry for this particular codeword/memory address, the controller may update (390) the bypass buffer.

In an example, updating the bypass buffer includes performing an ECC operation on the codeword (if needed). Data associated with the codeword is then stored in a codeword field (e.g., codeword 240 (FIG. 2)) of the bypass buffer. The memory address of the memory device from which the codeword was originally read is also stored in the bypass buffer (e.g., as the memory address 230 (FIG. 2)) and is associated with the codeword. A valid entry indicator (e.g., valid entry indicator 220 (FIG. 2)) is also set, thereby indicating that this particular entry in the bypass buffer has been updated with a corrected codeword. The method 300 may then be repeated for another codeword.

In an example, the controller may also determine whether the bypass buffer has room for additional entries prior to updating the bypass buffer. For example and as previously described, the bypass buffer may have a limited amount of entries (e.g., one-thousand). If all of the entries are taken, additional codewords may not be added to the bypass buffer.

Figure 4:
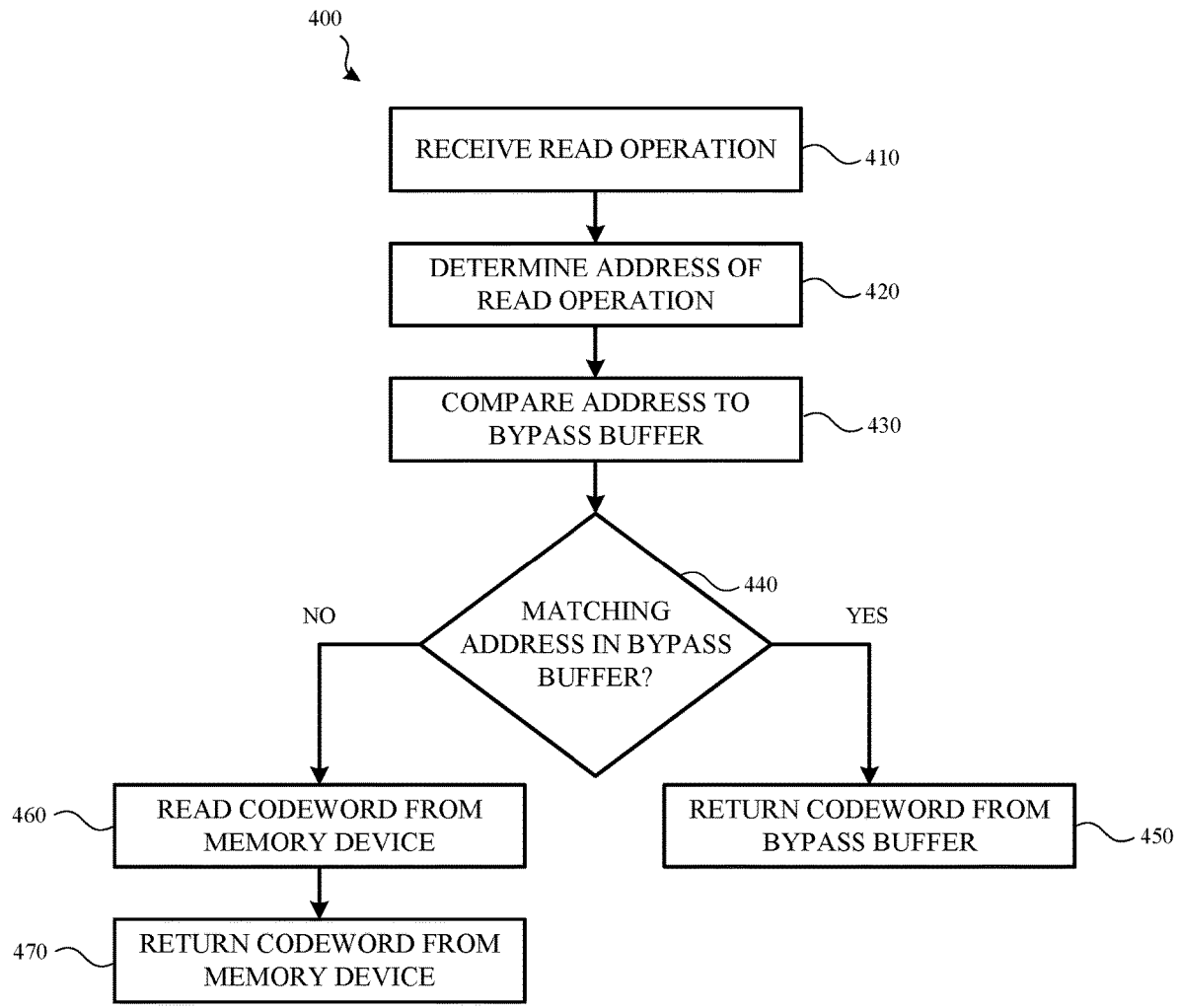
FIG. 4 illustrates a method for performing a read operation on a bypass buffer according to an example.

FIG. 4 illustrates a method 400 for performing a read operation on a bypass buffer according to an example. In an example, the method 400 may be performed by a controller such as, for example, the controller 150 shown and described with respect to FIG. 1. Likewise, the bypass buffer may be similar to the bypass buffer 180 shown and described with respect to FIG. 1 and/or the bypass buffer 200 shown and described with respect to FIG. 2.

Method 400 begins when the controller receives (410) a read operation. In an example, the read operation is received from a host device. When the read operation is received, the controller determines (420) a memory address associated with the read operation.

The controller may then compare (430) the memory address associated with the read operation to the various memory address entries (e.g., memory address 230 (FIG. 2)) in the bypass buffer. If the controller determines (440) that a matching memory address is found as an entry in the bypass buffer, the controller returns (450) the codeword (e.g., codeword 240 (FIG. 2)) associated with the memory address from the bypass buffer. However, if the controller determines (440) that a matching entry was not found in the bypass buffer, the controller reads the codeword from the memory address of a memory device (e.g., memory device 155 (FIG. 1)), performs any error correction code operations (if needed), and returns (470) the codeword from the memory device.

Figure 5:
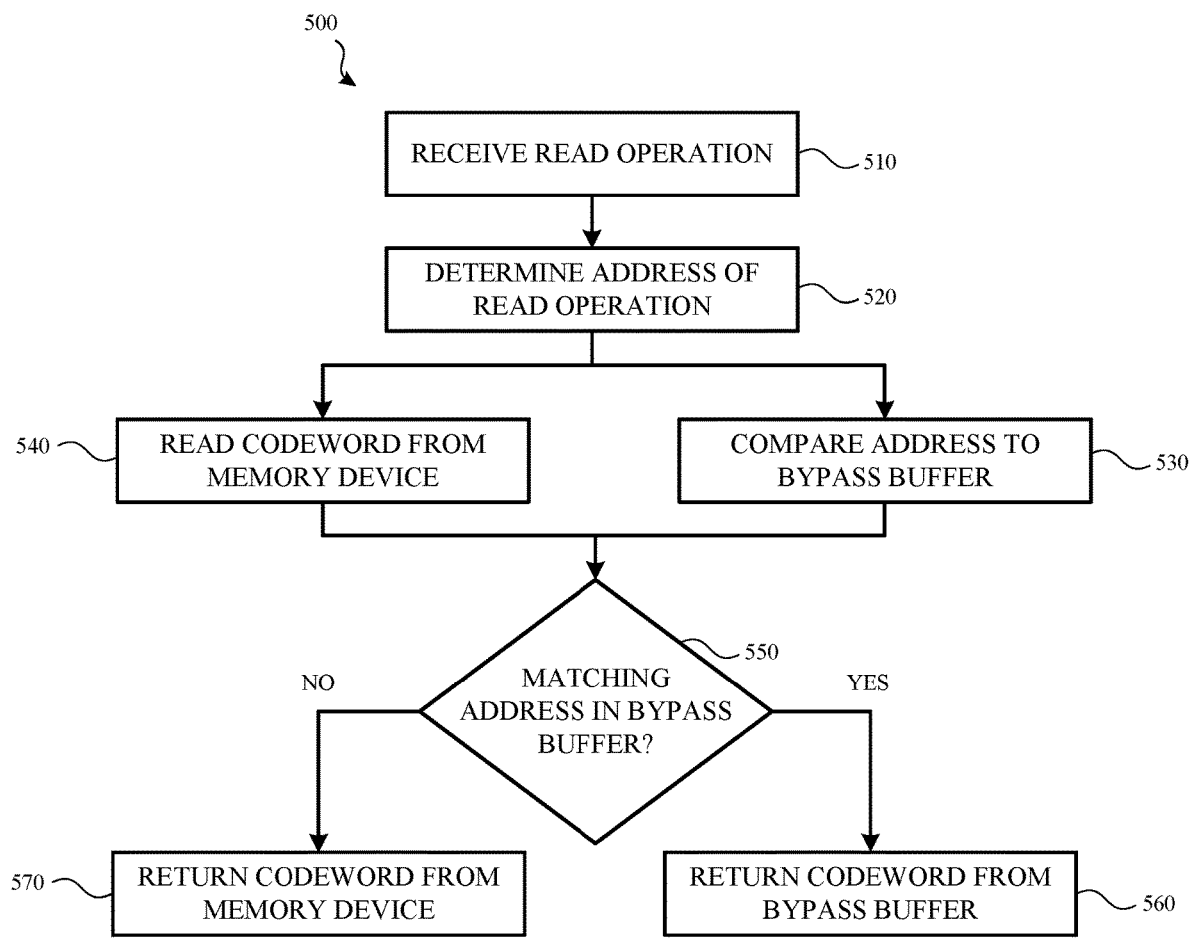
FIG. 5 illustrates another method for performing a read operation on a bypass buffer according to an example.

FIG. 5 illustrates another method 500 for performing a read operation on a bypass buffer according to an example. The example shown and described with respect to FIG. 5 is similar to the example shown and described with respect to FIG. 4. However, in this example, the read operation performed on the bypass buffer may be performed in parallel, or substantially in parallel, with the read operation performed on the memory address of the memory device. Because the read operations are performed in parallel, or substantially in parallel (as compared with the sequential reads shown and described with respect to FIG. 4), performance of the memory device may be improved.

Additionally, in the example that follows, the method 500 may be performed by a controller such as, for example, the controller 150 shown and described with respect to FIG. 1. Additionally, the method 500 may be performed on a bypass buffer and/or a memory device similar to the bypass buffer 180 and the memory device 155 shown and described with respect to FIG. 1 and/or the bypass buffer 200 shown and described with respect to FIG. 2.

Method 500 begins when the controller receives (510) a read operation. In an example, the read operation is received from a host device (e.g., host device 105 (FIG. 1)). When the read operation is received, the controller determines (520) a memory address associated with the read operation.

The controller may then compare (530) the memory address associated with the read operation to the memory address (e.g., memory address 230 (FIG. 2)) of each entry in the bypass buffer. Additionally, and in parallel or substantially in parallel, the controller reads (540) the codeword from the memory address of the memory device. The controller may then determine (540) whether a matching memory address is found in the bypass buffer. If a matching memory address is found in the bypass buffer, the controller returns (560) the codeword associated with the memory address from the bypass buffer. The codeword read from the memory address of the memory device may be discarded.

However, if the controller determines (540) that a matching entry was not found in the bypass buffer, the controller may perform ECC operations (if needed) on the codeword that was read from the memory device (e.g., from operation 540), and returns (570) the codeword that was read from the memory device.

Figure 6:
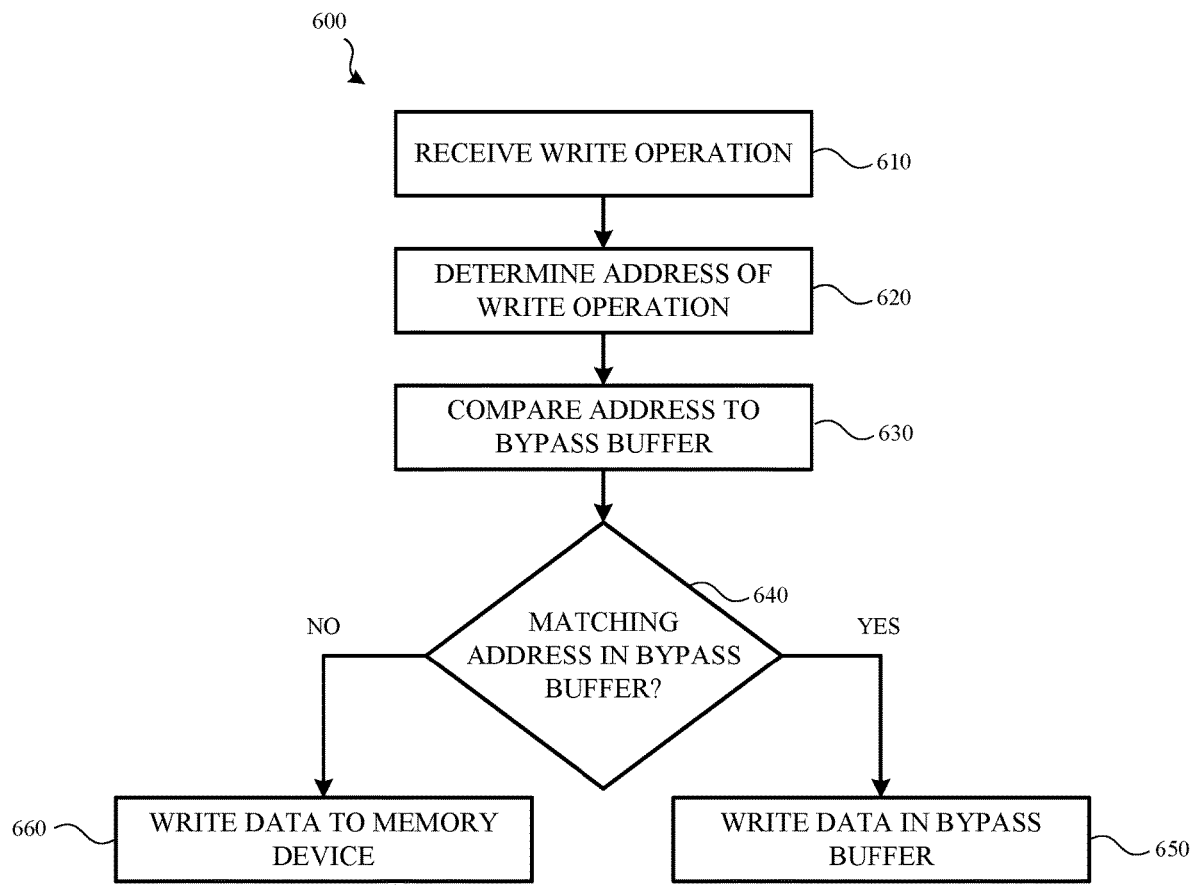
FIG. 6 illustrates a method for performing a write operation on a bypass buffer according to an example.

FIG. 6 illustrates a method 600 for performing a write operation on a bypass buffer according to an example. In an example, the method 600 may be performed by a controller such as described herein. Likewise, the bypass buffer and/or the memory device may be similar to the various bypass buffers and memory devices described herein.

Method 600 begins when the controller receives (610) a write operation. In an example, the write operation is received from a host device. When the write operation is received, the controller determines (620) a memory address associated with the write operation.

The controller may then compare (630) the memory address associated with the write operation to each entry in the bypass buffer to determine whether the bypass buffer includes the memory address associated with the write operation. If the controller determines (640) that a matching memory address is found in the bypass buffer, the controller writes (650) data associated with the write operation to the bypass buffer. For example, the data associated with the write operation is written in the codeword field (e.g., codeword 240 (FIG. 2)) of an entry in the bypass buffer that is associated with the memory address specified by the write operation.

However, if the controller determines (640) that a matching entry was not found in the bypass buffer (e.g., the memory address associated with the write command is not in the bypass buffer), the controller writes (660) the data associated with the write command to the memory address of the memory device.

Figure 7:
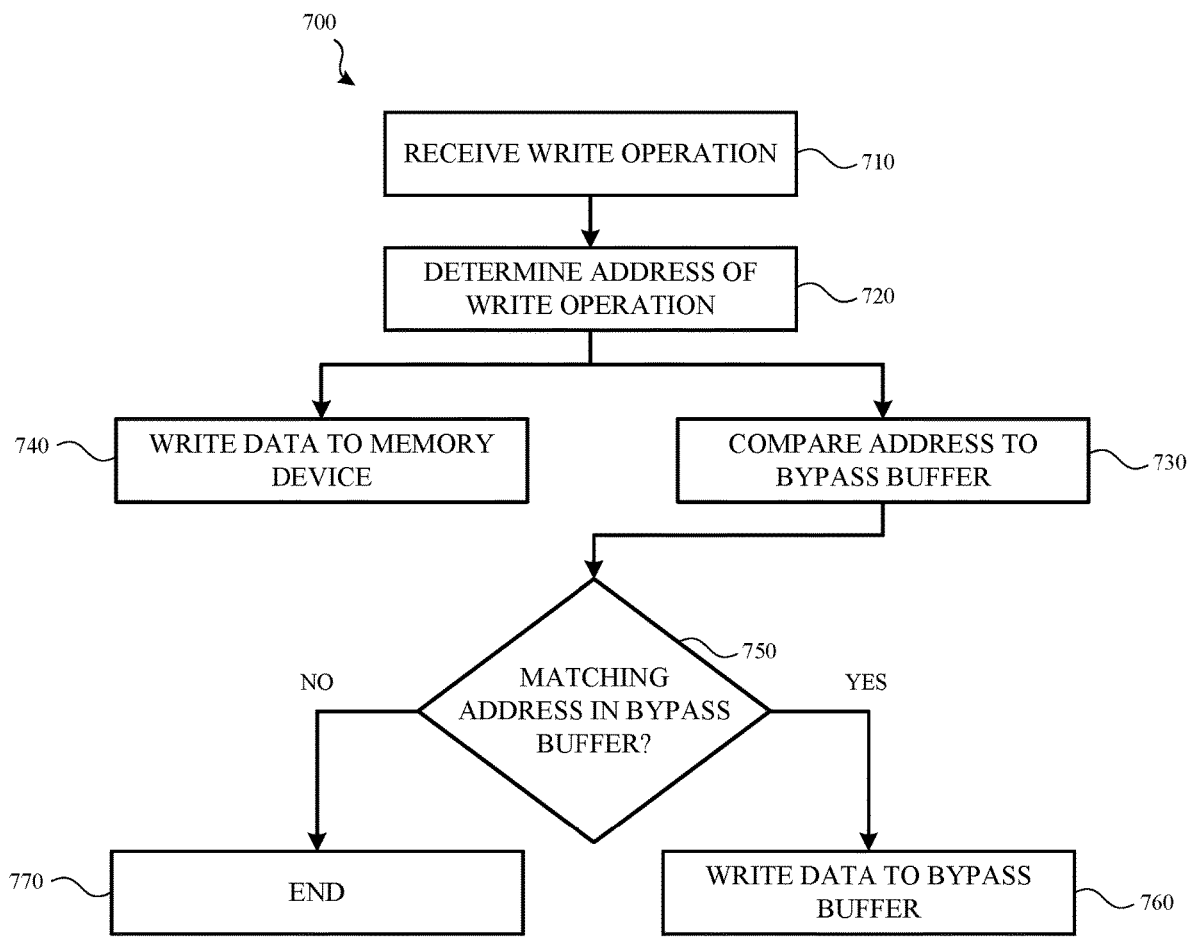
FIG. 7 illustrates another method for performing a write operation a bypass buffer according to an example.

FIG. 7 illustrates another method 700 for performing a write operation on a bypass buffer according to an example. The example shown and described with respect to FIG. 7 is similar to the example shown and described with respect to FIG. 6. However, in this example, the write operation performed on the bypass buffer may be performed in parallel, or substantially in parallel, with the write operation performed on the memory device. Because the write operations are performed in parallel or substantially in parallel (as compared with the sequential writes shown and described with respect to FIG. 6), performance of the memory device may be improved.

Additionally, in the example that follows, the method 700 may be performed by a controller such as previously described herein. Likewise, the bypass buffer and/or the memory device may be similar to the various bypass buffers and memory devices described herein.

Method 700 begins when the controller receives (710) a write operation. In an example, the write operation is received from a host device (e.g., host device 105 (FIG. 1)). When the write operation is received, the controller determines (720) a memory address associated with the write operation. For example, the controller determines (720) a memory address of the memory device to which the data associated with the write command is to be written.

The controller may then compare (730) the memory address associated with the write operation to the various memory address (e.g., memory address 230 (FIG. 2)) entries in the bypass buffer. Additionally, and in parallel or substantially in parallel, the controller writes (740) the data associated with the write command to the specified memory address of the memory device.

The controller may also determine (750) whether a matching address is found in the bypass buffer. If a matching memory address is found in the bypass buffer, the controller writes (760) (e.g., overwrites) the codeword stored in the bypass buffer that is associated with the memory address of the newly received data. However, if the controller determines (750) that a matching entry was not found in the bypass buffer, the method ends (770) as the data has already been written in the correct memory address of the memory device.

FIG. 8 illustrates a bypass buffer 800 having a confidence indicator 850 according to an example. The bypass buffer 800 may be similar to the bypass buffer 180 shown and described with respect to FIG. 1. In an example, the bypass buffer 800 may be structured as a content-addressable memory (CAM) or some other associative memory such as previously described.

In an example, the bypass buffer 800 includes n number of entries 810. For example, the bypass buffer 800 may include one-thousand entries. Although one-thousand entries are mentioned, the bypass buffer 800 may include any number of entries. Each entry 810 of the bypass buffer 800 may include a valid entry indicator 820, a memory address 830 a codeword 840 (or data associated with a codeword) and a confidence indicator 850.

In an example, the codeword 840 of each entry 810 is a codeword that was identified as having over a threshold number of worn out bits. For example, if a controller determines a particular codeword stored at a particular memory address of a memory device (e.g., memory device 155 (FIG. 1)) has x worn out bits, the controller causes an error correction system (e.g., ECC system 185 (FIG. 1)) to correct any errors in the codeword. The controller may also cause the corrected codeword to be stored as an entry 810 in the bypass buffer 800.

The controller may also store the memory address 830 of the memory device from which the original codeword was read in the bypass buffer 800. In an example, the memory address 830 is associated with the corrected codeword 840 in the bypass buffer 800.

The bypass buffer 800 also includes a valid entry indicator 820. In an example, the valid entry indicator 820 is a bit or other indicator that informs the controller that a particular entry 810 in the bypass buffer includes valid data (e.g., a corrected codeword 840 and a memory address associated with the originally read codeword) rather than data that was used to initialize the bypass buffer.

The bypass buffer 800 may also include a confidence indicator 850. The confidence indicator 850 may be used to determine whether any codewords and/or associated memory addresses have been incorrectly added (e.g., false positives) to the bypass buffer 800. For example, during a determination as to whether the number of worn out bits of a codeword exceeds a worn out bit threshold (e.g., operation 370 (FIG. 3)), the number of worn out bits of the codeword may be incorrectly determined or otherwise erroneously reported.

Accordingly, the confidence indicator 850 may be incremented when a matching entry (e.g., a codeword 840 and/or a memory address) is found in the bypass buffer and decremented when a matching entry is not found in the bypass buffer. In an example, the confidence indicator 850 may be incremented until saturation (e.g., until a matching entry has been found in the bypass buffer y number of times). In another example, if the confidence indicator is decremented (e.g., due to a matching entry not being found in the bypass buffer) and reaches zero, the entry in the bypass buffer is removed (e.g., a bit associated with the valid entry indicator 820 is flipped).

Figure 9:
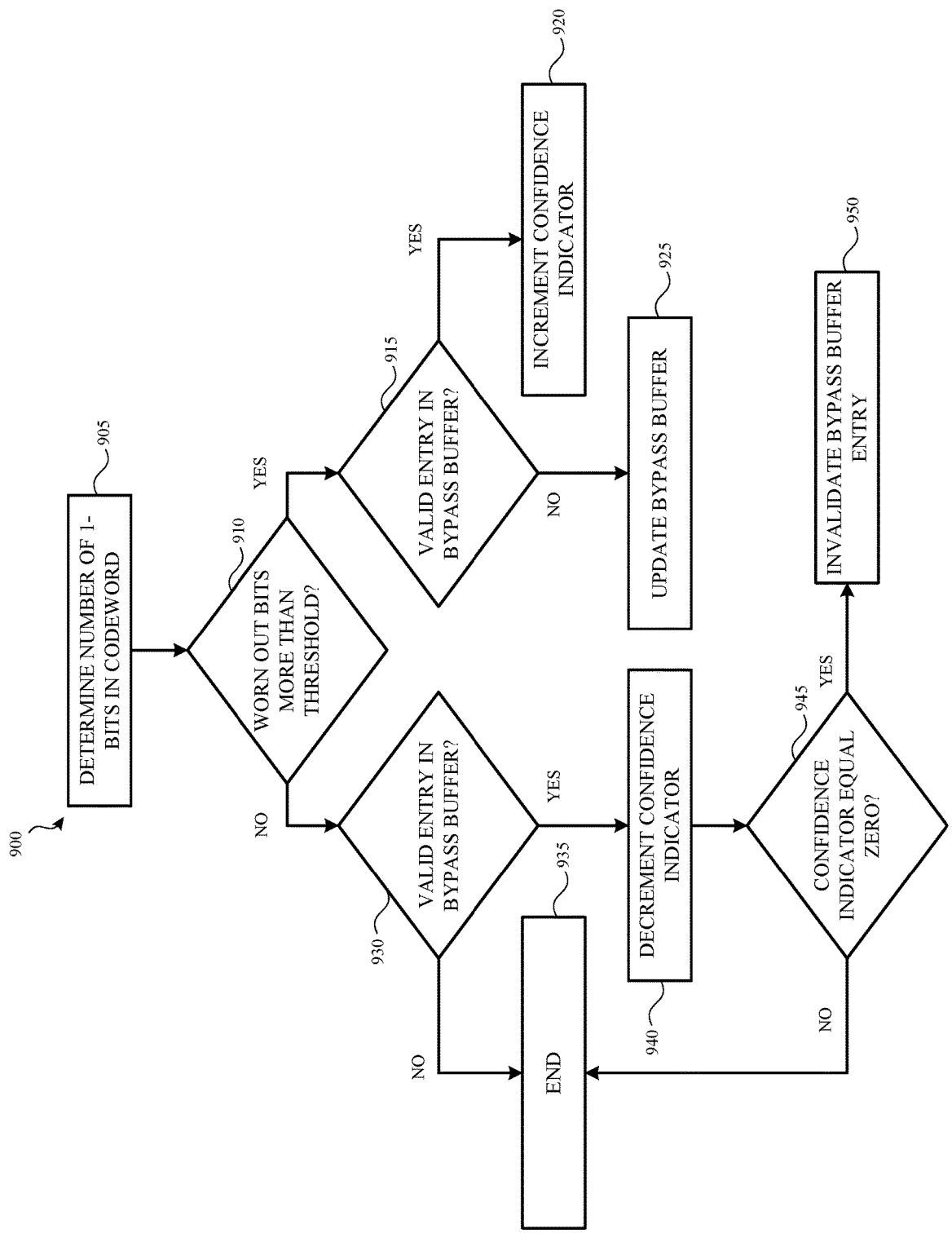
FIG. 9 illustrates a method for determining whether a codeword should be added to a bypass buffer according to an example.

Additional information about the bypass buffer 800, as well as how the bypass buffer 800 is populated and used, is explained in more detail with respect to FIG. 9.

FIG. 9 illustrates a method 900 for determining whether a codeword should be added to a bypass buffer according to an example. In an example, the method 900 may be executed by a controller such as previously described herein. Likewise, the method 900 may be used on or in conjunction with the bypass buffer 800 shown and described with respect to FIG. 8.

In this example, operations of reading a codeword, storing original codeword data and writing test data to a memory address associated with the read command have already been performed. These operations may be similar to operation 310—operation 330 shown and described with respect to FIG. 3. Once those operations have been performed, the controller may determine (905) a number of 1-bits in the codeword. As previously discussed, although a number of 1-bits is specifically described, the controller may determine a number of 0-bits in the codeword once the test data has been written to the memory address associated with the received read command.

The controller may then determine (910) whether the number of worn out bits in the codeword exceeds a worn out bit threshold. If it is determined (910) the number of worn out bits of the codeword exceeds the worn out bit threshold, the controller may further determine (915) whether there is a valid entry in the bypass buffer. In an example, this determination may be made based, at least in part, on comparing the memory address associated with the memory location from which the codeword was read to each memory address field (e.g., memory address 830 (FIG. 8)) in each entry of the bypass buffer.

If the controller determines (915) the bypass buffer already includes an entry for this particular codeword/memory address, the confidence indicator associated with this particular entry is incremented (920). The method 900 may then be repeated for another codeword.

However, if the controller determines (915) the bypass buffer does not include an entry for this particular codeword/memory address, the controller may update (925) the bypass buffer.

In an example, updating the bypass buffer includes performing an error correction code operation on the codeword (if needed). Data associated with the codeword may then be stored in a codeword field (e.g., codeword 840 (FIG. 8)) of the bypass buffer. The memory address of the memory device from which the codeword was originally read is also stored in the bypass buffer (e.g., as the memory address 830) and is associated with the codeword. A valid entry indicator (e.g., valid entry indicator 820 (FIG. 8)) is also set, thereby indicating that this particular entry in the bypass buffer has been updated with a corrected codeword. Additionally, the confidence indicator associated with this entry is set (e.g., set to 1) to indicate that this entry is a newly added entry. The method 900 may then be repeated for another codeword.

In an example, the controller may also determine whether the bypass buffer has room for additional entries prior to updating the bypass buffer. For example and as previously described, the bypass buffer may have a limited amount of entries. Thus, if all of the entries are taken, additional codewords may not be added to the bypass buffer.

Referring back to operation 910, if the controller determines the worn out bits for this particular codeword does not exceed the worn out bit threshold, the controller may subsequently determine (930) whether there is a valid entry associated with this codeword in the bypass buffer. For example, the controller may determine whether this particular codeword was incorrectly added to the bypass buffer. In an example, this determination is based, at least in part, on comparing the memory address associated with the memory location from which the codeword was read to each memory address field (e.g., memory address 830 (FIG. 8)) in each entry of the bypass buffer.

If it is determined (930) that a valid entry associated with the codeword is not in the bypass buffer, the method 900 may end (935). The method 900 may then be repeated for another codeword.

However, it if it is determined (930) that a valid entry associated with the codeword is in the bypass buffer (e.g., the codeword has (potentially) been incorrectly added to the bypass buffer), the controller decrements (940) the confidence indicator associated with this entry. Once the confidence indicator has been decremented, the controller may determine (945) whether the confidence indicator is zero. If the controller determines the confidence indicator is not zero (or is greater than zero) the method ends (935). The method 900 may then be repeated for another codeword.

However, if it is determined that the confidence indicator associated with this entry is equal to zero (or less than zero), the bypass buffer entry associated with this particular codeword and/or memory address is deallocated. In an example, the bypass buffer entry associated with the particular codeword and/or memory address is deallocated by switching/flipping a bit associated with the valid entry indicator.

Figure 10:
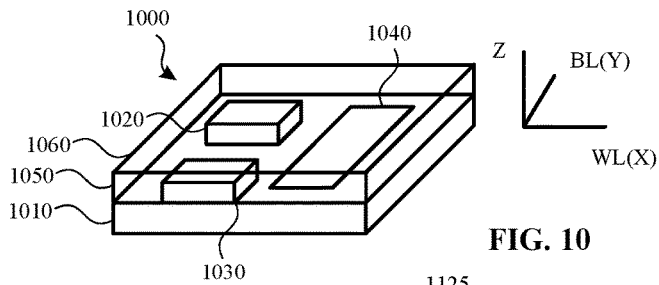
FIG. 10 is a perspective view of a storage device that includes three-dimensional (3D) stacked non-volatile memory according to an example.
Figure 11:
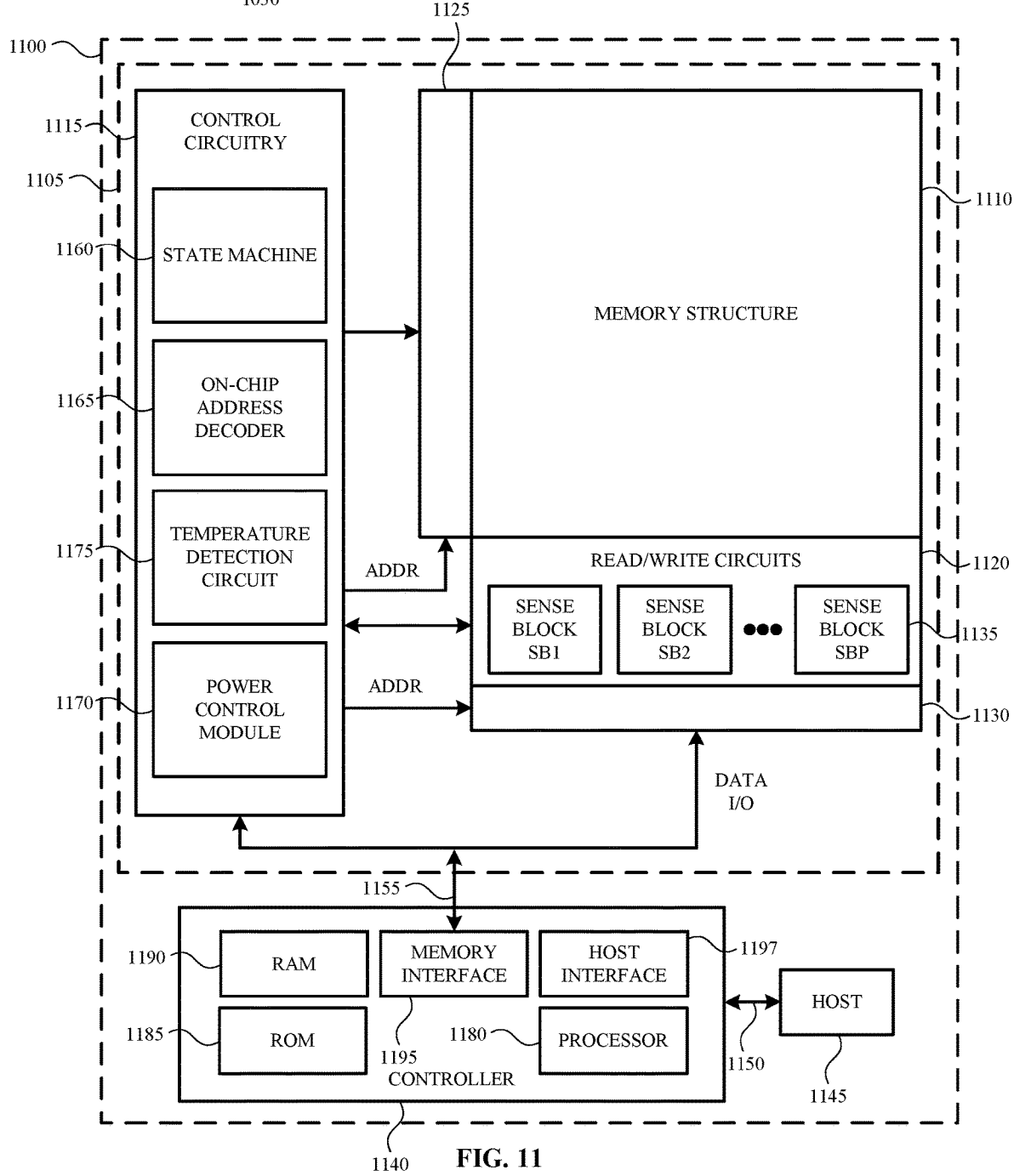
FIG. 11 is a block diagram of a storage device according to an example.

FIG. 10-FIG. 11 describe example storage devices that may be used with or otherwise implement the various features described herein. For example, the storage devices shown and described with respect to FIG. 10-FIG. 11 may include various systems and components that are similar to the systems and components shown and described with respect to FIG. 1. For example, the controller 1140 shown and described with respect to FIG. 11 may be similar to the controller 150 of FIG. 1. Likewise, the memory dies 1105 may be similar to the first memory die 165 and/or the second memory die 170 of FIG. 1.

FIG. 10 is a perspective view of a storage device 1000 that includes three-dimensional (3D) stacked non-volatile memory according to an example. In this example, the storage device 1000 includes a substrate 1010. Blocks of memory cells are included on or above the substrate 1010. The blocks may include a first block (BLK0 1020) and a second block (BLK1 1030). Each block may be formed of memory cells (e.g., non-volatile memory elements). The substrate 1010 may also include a peripheral area 1040 having support circuits that are used by the first block and the second block.

The substrate 1010 may also carry circuits under the blocks, along with one or more lower metal layers which are patterned in conductive paths to carry signals from the circuits. The blocks may be formed in an intermediate region 1050 of the storage device 1000. The storage device may also include an upper region 1060. The upper region 1060 may include one or more upper metal layers that are patterned in conductive paths to carry signals from the circuits. Each block of memory cells may include a stacked area of memory cells. In an example, alternating levels of the stack represent word lines. While two blocks are depicted, additional blocks may be used and extend in the x-direction and/or the y-direction.

In an example, a length of a plane of the substrate 1010 in the x-direction represents a direction in which signal paths for word lines or control gate lines extend (e.g., a word line or drain-end select gate (SGD) line direction) and the width of the plane of the substrate 1010 in the y-direction represents a direction in which signal paths for bit lines extend (e.g., a bit line direction). The z-direction represents a height of the storage device 1000.

FIG. 11 is a functional block diagram of a storage device 1100 according to an example. In an example, the storage device 1100 may be the 3D stacked non-volatile storage device 1000 shown and described with respect to FIG. 10. The components depicted in FIG. 11 may be electrical circuits. In an example, the storage device 1100 includes one or more memory dies 1105. Each memory die 1105 includes a three-dimensional memory structure 1110 of memory cells (e.g., a 3D array of memory cells), control circuitry 1115, and read/write circuits 1120. In another example, a two-dimensional array of memory cells may be used. The memory structure 1110 is addressable by word lines using a first decoder 1125 (e.g., a row decoder) and by bit lines using a second decoder 1130 (e.g., a column decoder). The read/write circuits 1120 may also include multiple sense blocks 1135 including SB1, SB2, . . . , SBp (e.g., sensing circuitry) which allow pages of the memory cells to be read or programmed in parallel. The sense blocks 1135 may include bit line drivers.

In an example, a controller 1140 is included in the same storage device 1100 as the one or more memory dies 1105. In another example, the controller 1140 is formed on a die that is bonded to a memory die 1105, in which case each memory die 1105 may have its own controller 1140. In yet another example, a controller die controls all of the memory dies 1105.

Commands and data may be transferred between a host 1145 and the controller 1140 using a data bus 1150. Commands and data may also be transferred between the controller 1140 and one or more of the memory dies 1105 by way of lines 1155. In one example, the memory die 1105 includes a set of input and/or output (I/O) pins that connect to lines 1155.

The memory structure 1110 may also include one or more arrays of memory cells. The memory cells may be arranged in a three-dimensional array or a two-dimensional array. The memory structure 1110 may include any type of non-volatile memory that is formed on one or more physical levels of arrays of memory cells having an active area disposed above a silicon substrate. The memory structure 1110 may be in a non-volatile memory device having circuitry associated with the operation of the memory cells, whether the associated circuitry is above or within the substrate.

The control circuitry 1115 works in conjunction with the read/write circuits 1120 to perform memory operations (e.g., erase, program, read, and others) on the memory structure 1110. The control circuitry 1115 may include registers, ROM fuses, and other devices for storing default values such as base voltages and other parameters.

The control circuitry 1115 may also include a state machine 1160, an on-chip address decoder 1165, a power control module 1170 and a temperature detection circuit 1175. The state machine 1160 may provide chip-level control of various memory operations. The state machine 1160 may be programmable by software. In another example, the state machine 1160 does not use software and is completely implemented in hardware (e.g., electrical circuits).

The on-chip address decoder 1165 may provide an address interface between addresses used by host 1145 and/or the controller 1140 to a hardware address used by the first decoder 1125 and the second decoder 1130.

The power control module 1170 may control power and voltages that are supplied to the word lines and bit lines during memory operations. The power control module 1170 may include drivers for word line layers in a 3D configuration, select transistors (e.g., SGS and SGD transistors) and source lines. The power control module 1170 may include one or more charge pumps for creating voltages.

The control circuitry 1115 may also include a temperature detection circuit 1175. The temperature detection circuit may be configured to detect a temperature of one or more components of the memory device 1100.

The control circuitry 1115, the state machine 1160, the on-chip address decoder 1165, the first decoder 1125, the second decoder 1130, the temperature detection circuit 1175, the power control module 1170, the sense blocks 1135, the read/write circuits 1120, and/or the controller 1140 may be considered one or more control circuits and/or a managing circuit that perform some or all of the operations described herein.

In an example, the controller 1140, is an electrical circuit that may be on-chip or off-chip. Additionally, the controller 1140 may include one or more processors 1180, ROM 1185, RAM 1190, memory interface 1195, and host interface 1197, all of which may be interconnected. In an example, the one or more processors 1180 is one example of a control circuit. Other examples can use state machines or other custom circuits designed to perform one or more functions. Devices such as ROM 1185 and RAM 1190 may include code such as a set of instructions. One or more of the processors 1180 may be operable to execute the set of instructions to provide some or all of the functionality described herein.

Alternatively or additionally, one or more of the processors 1180 may access code from a memory device in the memory structure 1110, such as a reserved area of memory cells connected to one or more word lines. The memory interface 1195, in communication with ROM 1185, RAM 1190, and one or more of the processors 1180, may be an electrical circuit that provides an electrical interface between the controller 1140 and the memory die 1105. For example, the memory interface 1195 may change the format or timing of signals, provide a buffer, isolate from surges, latch I/O, and so forth.

The one or more processors 1180 may issue commands to control circuitry 1115, or any other component of memory die 1105, using the memory interface 1195. The host interface 1197, in communication with the ROM 1185, the RAM 1195, and the one or more processors 1180, may be an electrical circuit that provides an electrical interface between the controller 1140 and the host 1145. For example, the host interface 1197 may change the format or timing of signals, provide a buffer, isolate from surges, latch I/O, and so on. Commands and data from the host 1145 are received by the controller 1140 by way of the host interface 1197. Data sent to the host 1145 may be transmitted using the data bus 1150.

Multiple memory elements in the memory structure 1110 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

One of ordinary skill in the art will recognize that the technology described herein is not limited to a single specific memory structure, but covers many relevant memory structures within the spirit and scope of the technology as described herein and as understood by one of ordinary skill in the art.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Accordingly, examples of the present disclosure describe a method, comprising: reading data associated with a codeword located at a memory address of a memory device; storing the data associated with the codeword in a temporary storage location; writing test data to the memory address associated with the codeword, the test data comprising a number of bits with each bit in a first state; reading the test data from the memory address associated with the codeword; determining a number of bits in the test data having a second state that is different from the first state; and based, at least in part, on determining the number of bits in the second state is above a threshold: storing the data associated with the codeword as an entry in a bypass buffer; and associating the entry in the bypass buffer with the memory address of the memory device. In an example, the method also includes updating a valid entry indicator associated with the entry in the bypass buffer based, at least in part, on the data associated with the codeword being stored as the entry in the bypass buffer. In an example, the method also includes writing the data associated with the codeword from the temporary storage location to the memory address of the memory device based, at least in part, on determining the number of bits in the second state is below the threshold. In an example, the method also includes performing an error correction code operation on the data associated with the codeword based, at least in part, on the data associated with the codeword being read from the memory address of the memory device. In an example, the method also includes receiving a read request, the read request being associated with a codeword located at a particular memory address of the memory device; determining whether the particular memory address is associated with a particular entry in the bypass buffer; and based, at least in part, on determining the particular memory address is associated with the particular entry in the bypass buffer, returning data associated with the particular entry. In an example, the method also includes receiving a read request, the read request being associated with a codeword located at a particular memory address of the memory device; reading data associated with the codeword from the particular memory address of the memory device; determining whether the particular memory address is associated with a particular entry in the bypass buffer; and based, at least in part, on determining the particular memory address is associated with the particular entry in the bypass buffer, returning data associated with the particular entry. In an example, the method also includes returning the data read from the particular memory address of the memory device based, at least in part, on determining the particular memory address is absent from the bypass buffer. In an example, the method also includes receiving a write request, the write request being associated with a particular memory address of the memory device; determining whether the particular memory address is associated with a particular entry in the bypass buffer; and based, at least in part, on determining the particular memory address is associated with the particular entry in the bypass buffer, writing data associated with the write request in the particular entry in the bypass buffer. In an example, the method also includes writing the data associated with the write request to the particular memory address of the memory device based, at least in part, on determining the particular memory address is absent from the bypass buffer. In an example, the data associated with the write request is written to the particular memory address of the memory device in parallel with the data associated with the write request being written to the particular entry in the bypass buffer. In an example, the method also includes updating a confidence indicator associated with the entry in the bypass buffer based, at least in part, on storing the data associated with the codeword as the entry in a bypass buffer.

In another example, the present disclosure describes a data storage device, comprising: a controller; and a memory communicatively coupled to the controller and storing instructions that, when executed by the controller, causes the controller to: read data associated with a codeword located at a memory address of a memory device of the data storage device; store the data associated with the codeword in a temporary storage location; write test data to the memory address to determine a number of worn out bits associated with the codeword, the test data comprising a number of bits, with each bit in the same state; read the test data from the memory address; determine a number of bits in the test data having a different state; and based, at least in part, on determining the number of bits in the different state is above a threshold: store the data associated with the codeword as an entry in a bypass buffer; and associate the entry in the bypass buffer with the memory address of the memory device. In an example, the instructions also include instructions for updating a valid entry indicator associated with the entry in the bypass buffer based, at least in part, on the data associated with the codeword being stored as the entry in the bypass buffer. In an example, the instructions also include instructions for writing the data associated with the codeword from the temporary storage location to the memory address of the memory device based, at least in part, on determining the number of bits in the different state is below the threshold. In an example, the instructions also include instructions for performing an error correction code operation on the data associated with the codeword based, at least in part, on the data associated with the codeword being read from the memory address of the memory device. In an example, the instructions also include instructions for: receiving a read request, the read request being associated with a codeword located at a particular memory address of the memory device; determining whether the particular memory address is associated with a particular entry in the bypass buffer; and based, at least in part, on determining the particular memory address is associated with the particular entry in the bypass buffer, returning data associated with the particular entry. In an example, the instructions also include instructions for receiving a read request, the read request being associated with a codeword located at a particular memory address of the memory device; reading data associated with the codeword from the particular memory address of the memory device; determining whether the particular memory address is associated with a particular entry in the bypass buffer; and based, at least in part, on determining the particular memory address is associated with the particular entry in the bypass buffer, returning data associated with the particular entry. In an example, the instructions also include instructions for receiving a write request, the write request being associated with a particular memory address of the memory device; determining whether the particular memory address is associated with a particular entry in the bypass buffer; and based, at least in part, on determining the particular memory address is associated with the particular entry in the bypass buffer, writing data associated with the write request in the particular entry in the bypass buffer.

In another example, the present disclosure describes a data storage device, comprising: means for reading data associated with a codeword located at a memory address of a memory device of the data storage device; means for storing the data associated with the codeword in a temporary storage location; means for writing test data to the memory address; means for determining a number of worn out bits associated with the codeword, the number of worn out bits being based, at least in part, on a number of bits having a first state associated with the test data and a number of bits having a second state that is different from the first state; means for storing the data associated with the codeword as an entry in a bypass buffer based, at least in part on determining the number of bits in the second state is above a threshold; and means for associating the entry in the bypass buffer with the memory address of the memory device. In an example, the data storage device also includes means for updating a valid entry indicator associated with the entry in the bypass buffer.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
  reading a codeword located at a memory address of a memory device;
  storing the codeword in a temporary storage location;
  writing test data to the memory address associated with the codeword, the test data comprising a number of bits with each bit in a first state;
  reading the test data from the memory address associated with the codeword;

determining a number of bits in the test data having a second state that is different from the first state; and based, at least in part, on determining the number of bits in the second state is above a threshold:

storing the codeword as an entry in a bypass buffer;

associating the memory address of the memory device from which the codeword was read with the entry in the bypass buffer; and in response to receiving a command, determining whether a memory address associated with the command is associated with a particular entry in the bypass buffer.

2. The method of claim 1, further comprising updating a valid entry indicator associated with the entry in the bypass buffer based, at least in part, on the codeword being stored as the entry in the bypass buffer.

3. The method of claim 1, further comprising writing the codeword from the temporary storage location to the memory address of the memory device based, at least in part, on determining the number of bits in the second state is below the threshold.

4. The method of claim 1, further comprising performing an error correction code operation on the codeword based, at least in part, on the codeword being read from the memory address of the memory device.

5. The method of claim 1, wherein the command is a read command and is associated with a codeword located at a particular memory address of the memory device; and based, at least in part, on determining the particular memory address is associated with the particular entry in the bypass buffer, returning data associated with the particular entry.

6. The method of claim 1, wherein the command is a read command and is associated with a codeword located at a particular memory address of the memory device;

reading the codeword from the particular memory address of the memory device;

determining whether the particular memory address is associated with the particular entry in the bypass buffer; and based, at least in part, on determining the particular memory address is associated with the particular entry in the bypass buffer, returning data associated with the particular entry.

7. The method of claim 6, further comprising returning the data read from the particular memory address of the memory device based, at least in part, on determining the particular memory address is absent from the bypass buffer.

8. The method of claim 1, wherein the command is a write command and is associated with a particular memory address of the memory device; and based, at least in part, on determining the particular memory address is associated with the particular entry in the bypass buffer, writing data associated with the write request in the particular entry in the bypass buffer.

9. The method of claim 8, further comprising writing the data associated with the write request to the particular memory address of the memory device based, at least in part, on determining the particular memory address is absent from the bypass buffer.

10. The method of claim 9, wherein the data associated with the write request is written to the particular memory address of the memory device in parallel with the data associated with the write request being written to the particular entry in the bypass buffer.

11. The method of claim 1, further comprising updating a confidence indicator associated with the entry in the bypass buffer based, at least in part, on storing the codeword as the entry in a bypass buffer.

12. A data storage device, comprising:

a controller operable to:

read a codeword located at a memory address of a memory device of the data storage device;

store the codeword in a temporary storage location;

write test data to the memory address to determine a number of worn out bits associated with the codeword, the test data comprising a number of bits, with each bit in the same state;

read the test data from the memory address;

determine a number of bits in the test data having a different state; and based, at least in part, on determining the number of bits in the different state is above a threshold:

store the codeword as an entry in a bypass buffer;

associate the entry in the bypass buffer with the memory address of the memory device; and in response to receiving a command, determine whether a memory address associated with the command is associated with a particular entry in the bypass buffer.

13. The system of claim 12, wherein the controller is further operable to update a valid entry indicator associated with the entry in the bypass buffer based, at least in part, on the data associated with the codeword being stored as the entry in the bypass buffer.

14. The system of claim 12, wherein the controller is further operable to write the codeword from the temporary storage location to the memory address of the memory device based, at least in part, on determining the number of bits in the different state is below the threshold.

15. The system of claim 12, wherein the controller is further operable to perform an error correction code operation on the codeword based, at least in part, on the codeword being read from the memory address of the memory device.

16. The system of claim 12, wherein the command is a read command and is associated with a codeword located at a particular memory address of the memory device and wherein the controller is further operable to:

return data associated with the particular entry based, at least in part, on determining the particular memory address is associated with the particular entry in the bypass buffer.

17. The system of claim 12, wherein the command is read command and is associated with a codeword located at a particular memory address of the memory device and wherein the controller is further operable to:

read the codeword from the particular memory address of the memory device;

determine whether the particular memory address is associated with a particular entry in the bypass buffer; and based, at least in part, on a determination that the particular memory address is associated with the particular entry in the bypass buffer, return data associated with the particular entry.

18. The system of claim 12, wherein the command is a write command and is associated with a particular memory address of the memory device and wherein the controller is further operable to:

write data associated with the write request in the particular entry in the bypass buffer based, at least in part, on a determination that the particular memory address is associated with the particular entry in the bypass buffer.

19. A data storage device, comprising:
means for reading a codeword located at a memory address of a memory device of the data storage device;
means for storing the codeword in a temporary storage location;
means for writing test data to the memory address;
means for determining a number of worn out bits associated with the codeword, the number of worn out bits being based, at least in part, on a number of bits having a first state associated with the test data and a number of bits having a second state that is different from the first state;
means for storing the codeword as an entry in a bypass buffer based, at least in part on a determination that the number of bits in the second state is above a threshold;
means for associating the entry in the bypass buffer with the memory address of the memory device;
means for receiving a command; and
means for determining whether a memory address associated with the command is associated with a particular entry in the bypass buffer.

20. The data storage device of claim 19, further comprising means for updating a valid entry indicator associated with the entry in the bypass buffer.

* * * * *